United States Patent
Dorsel et al.

(10) Patent No.: US 6,486,457 B1
(45) Date of Patent: Nov. 26, 2002

(54) APPARATUS AND METHOD FOR AUTOFOCUS

(75) Inventors: Andreas N. Dorsel, Menlo Park, CA (US); Kenneth L. Staton, San Carlos, CA (US); Cassandra Dey, Palo Alto, CA (US); George P. Tsai, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/415,184

(22) Filed: Oct. 7, 1999

(51) Int. Cl.[7] .............................................. G02B 27/64
(52) U.S. Cl. ................... 250/201.4; 250/201.2
(58) Field of Search ..................... 250/201.2, 201.4, 250/201.5, 234–236; 396/119, 120; 356/138, 399, 400, 602, 609, 623, 624

(56) References Cited

U.S. PATENT DOCUMENTS

| | | | | |
|---|---|---|---|---|
| 4,383,168 A | * | 5/1983 | Luck, Jr. ..................... 250/201 |
| 4,843,228 A | * | 6/1989 | Nakamura .................... 250/201 |
| 4,930,896 A | * | 6/1990 | Horikawa ..................... 356/376 |
| 5,459,325 A | * | 10/1995 | Hueton et al. ............. 204/458.1 |
| 5,594,235 A | * | 1/1997 | Lee .......................... 250/201.3 |

\* cited by examiner

Primary Examiner—Kevin Pyo
Assistant Examiner—Seung C. Sohn

(57) ABSTRACT

A laser generates a collimated laser beam which passes through a lens off-axis. The beam is focused at a focal plane on a substrate surface. A first position sensitive detector receives the laser beam reflected from the substrate surface through the lens to generate a first signal proportional to lateral beam offset. A beam splitter may be provided to direct a portion of the laser beam before passing through the lens toward a second position sensitive detector to generate a second signal proportional to laser beam pointing instability. Apparatus computes the difference between the first and second signals, the difference being a defocused error signal. It is preferred that the first position sensitive detector be located at a distance from the lens that is at least twice the lens focal length.

2 Claims, 1 Drawing Sheet

APPARATUS AND METHOD FOR AUTOFOCUS

BACKGROUND OF THE INVENTION

This invention relates to an autofocus technique and more particularly to an autofocus methodology for use with fluorescence scanners.

In laser fluorescence scanning it is critical to eliminate as much as possible fluorescence (and scattering) from materials other than the surface-bound nucleic acids which have been tagged with fluorescing molecules. One method for reducing such background from sources outside the detection plane is the use of depth discrimination. In such a system, signals outside a detection plane are substantially minimized. The system, however, must make sure to keep the detection plane at the peak of the sensitivity vs. depth curve. If the system fails to keep the detection plane at the peak of the sensitivity vs. depth curve there will be a non-uniformity of the scanned images. Thus, in order to improve performance in fluorescence scanning, a need exists for focusing with good precision onto the plane that has a fixed (preferably zero) distance from the surface of the substrate being scanned.

SUMMARY OF THE INVENTION

In one aspect, the invention is an autofocus apparatus including a laser for generating a collimated laser beam. A lens is positioned to receive the laser beam off-axis and to focus the beam at a fixed focal plane at a substrate surface. A first position sensitive detector receives the laser beam reflected from the substrate surface through the lens to generate a first signal proportional to lateral beam offset. A beam splitter may direct a portion of the laser beam before passing through the lens toward a second position sensitive detector to generate a second signal proportional (except for possible offsets) to laser beam pointing errors. In this case, additional apparatus may be used to compute the difference of the positions from the first and second position sensitive detectors, which will be (except for possible offsets) proportional to the defocus error signal corrected for laser pointing error. As will be appreciated by those skilled in the art, this defocus error signal can be used in a control loop to reduce this error signal to achieve autofocus. In one embodiment, an offset is added so that the system will focus on a plane that differs from the substrate surface. It is preferred that the first position sensitive detector and the second position sensitive detector be located approximately the same total distance from the laser.

DESCRIPTION OF THE PREFERRED EMBODIMENT

Figure 1:
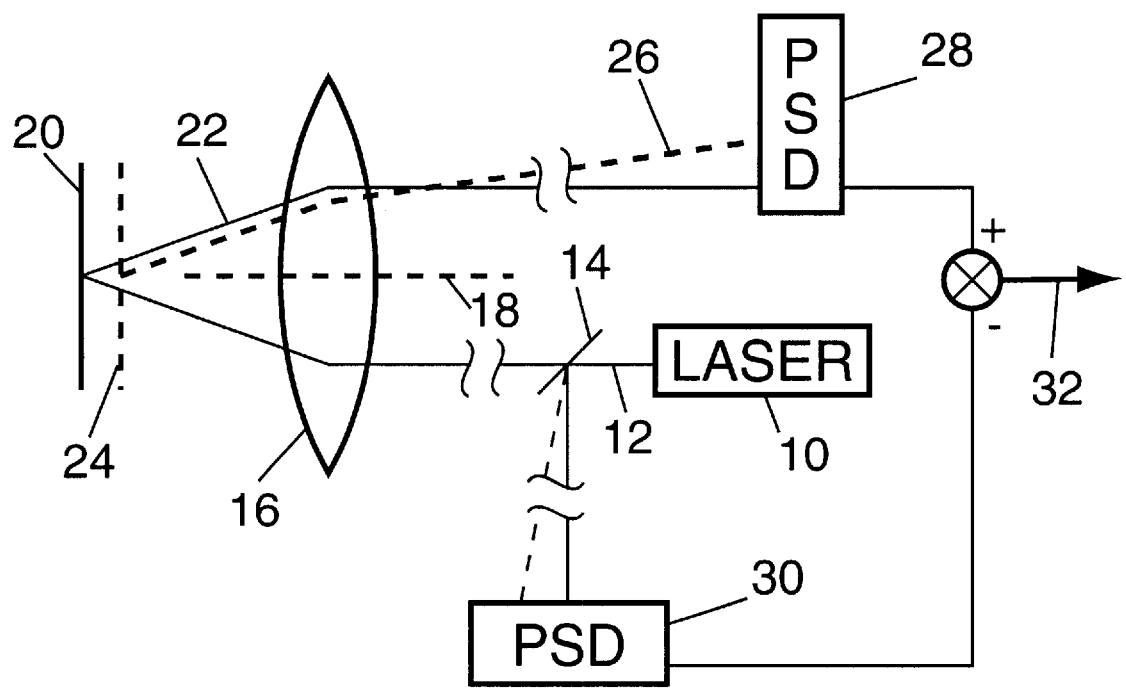
FIG. 1 is a schematic diagram of the autofocus apparatus of the invention.

With reference to FIG. 1 a laser 10 generates an essentially collimated laser beam 12 which passes through a beam splitter 14 and enters a high numerical aperture scan lens 16 off-center with respect to an optical axis 18 of the lens 16. When a sample surface 20 to be scanned is in the focal plane of the lens 16, a reflected beam 22 will exit the lens 16 parallel to the incident beam 12 at the same distance from the lens 16 optical axis 18 but on the opposite side of the optical axis 18. The focal plane of the lens 16 is the plane with the highest signal on the depth discrimination curve and may not coincide with the plane of smallest laser beam diameter (focus shift of Gaussion beams). If the sample surface 20 moves out of the focal plane as shown by the dotted line 24, the back-reflected beam will no longer be parallel to the incident beam 12 after passing through the lens 16 for the second time. The surface 24 being out of the focal plane results in lateral beam movement at larger distances from the lens. A dotted line 26 indicates such a lateral offset beam which falls upon a position sensitive detector (PSD) 28. The PSD 28 generates an output signal proportional to the lateral offset of, for example, the beam 26 with respect to the beam 22. The PSD 28 distance from the lens 16 is large with respect to the focal length of the lens 16. The distance should be at least twice the focal length; a suitable distance is up to 100 times the focal length. Those skilled in the art will recognize that adding an offset to the output of the PSD 28 may be used for alignment (setting the system to the right plane) as well as for intentionally focusing on a different plane.

It is expected that the beam 12 from the laser 10 may experience beam pointing instability (beam wander) and such pointing instability can cause erroneous focus signals. That is, if there is pointing instability in the beam 12 from the laser 10, the PSD 28 could register a lateral offset signal even when the scanning surface 20 is at the focal plane. To compensate for any such beam wander, the beam splitter 14 directs a portion of the beam 12 from the laser 10 onto a second position sensitive detector 30. As the beam 12 deviates the PSD 30 will generate a signal proportional to the deviation. The outputs of the PSD 28 and PSD 30 are differenced to generate a defocus error signal 32. That is, the difference of the two PSD signals is—except for possible offsets—a measure of defocus. As those skilled in the art will appreciate, the error signal 32 can be used in a closed loop system to maintain the sample surface 20 at the focal plane of the lens 16 by using a position sensor and actuator 34 to move either the lens or the sample.

The present invention offers a straightforward way to maintain relative alignment of focal/detection plane and substrate surface in the presence of beam wander. Unlike on-axis systems, the present methodology eliminates the effects caused by interference of light waves reflected from the front and back of transparent substrates. It is noted that for systems in which the distance between the scan lens 16 and the PSD 28 varies during scanning, the proportionality factor linking defocus and lateral displacement on the PSD varies also. In such a system the focusing planes are not parallel to each other since only the true focus plane is flat; for all non-zero offsets from the true focus plane, the system focuses on hyperbolas. With suitable computational circuitry, however, this can be compensated for so that focusing on an out-of-focus plane is also easily accomplished by anyone skilled in the art.

It is recognized that modifications and variations of the present invention will become apparent to those skilled in the art and it is intended that all such modifications and variations be included within the scope of the appended claims.

What is claimed is:

1. Autofocus apparatus comprising:

a laser for generating a collimated laser beam;

a lens positioned to receive the laser beam off-axis and to focus the beam at a focal plane on a substrate surface;

a first position sensitive detector for receiving the laser beam reflected from the substrate surface through the lens to generate a first signal proportional to lateral beam offset;

a second position sensitive detector to receive a portion of the laser beam before passing through the lens to generate a second signal proportional to laser beam pointing instability; and apparatus to compute the difference between the first and second signals.

2. The autofocus apparatus of claim 1, wherein the first and second position sensitive detectors are located approximately the same distance from the laser.

* * * * *